Oct. 9, 1951                E. R. JONES                2,570,244
                         DUMP TRUCK SCRAPER
Filed Sept. 7, 1949                                2 Sheets-Sheet 1

INVENTOR.
Eugene R. Jones
BY Victor J. Evans & Co.
ATTORNEYS

Oct. 9, 1951  E. R. JONES  2,570,244
DUMP TRUCK SCRAPER
Filed Sept. 7, 1949  2 Sheets-Sheet 2

INVENTOR.
Eugene R. Jones
BY Victor J. Evans & Co.
ATTORNEYS

Patented Oct. 9, 1951

2,570,244

UNITED STATES PATENT OFFICE 2,570,244

DUMP TRUCK SCRAPER

Eugene R. Jones, Glassboro, N. J.

Application September 7, 1949, Serial No. 114,348

3 Claims. (Cl. 214—83.3)

This invention relates to a dump truck, and more particularly to a dump truck used in transporting loads of coal and the like.

The object of the invention is to provide a dump truck that has a scraping device which can be manually actuated to scrape coal or the like from the corners and bed of the truck and push the coal out of the discharge end of the truck after the truck body has been tilted.

Another object of the invention is to provide a dump truck scraping device which will enable a person to readily scrape and push coal and the like from the truck without the necessity of dangerously climbing into the truck which may be wet and slippery from exposure to adverse weather conditions.

A further object of the invention is to provide a dump truck scraper which is extremely simple and inexpensive to manufacture.

Other objects and advantages will be apparent during the course of the following description.

In the accompanying drawings, forming a part of this application, and in which like numerals are used to designate like parts throughout the same:

Figure 1:
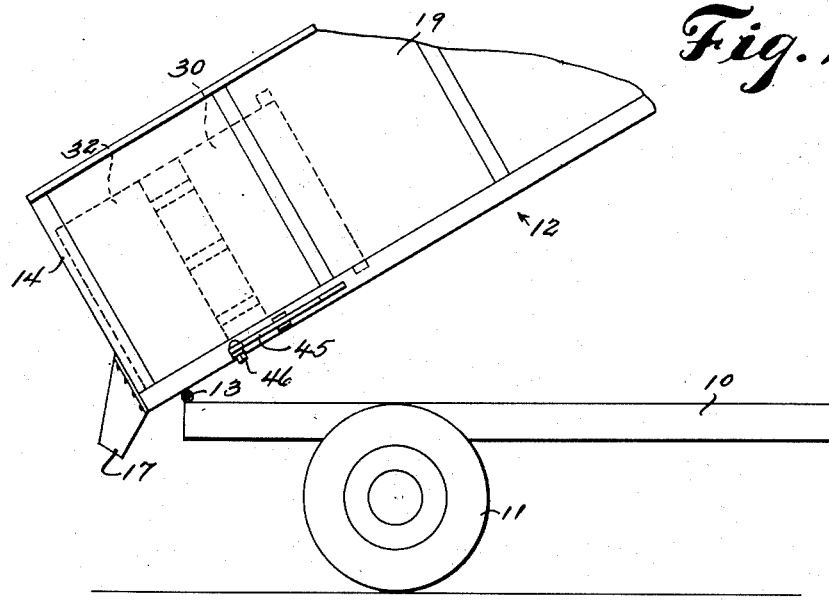
Figure 1 is a fragmentary side elevational view of a dump truck equipped with the scraper device of the present invention, and with the truck body in raised or tilted position.

Referring in detail to the drawings, the numeral 10 designates the frame of a conventional truck, the frame 10 being supported on ground engaging wheels 11, Figure 1. Supported on the frame 10 and mounted for swinging movement about a horizontal axis is a truck body 12, the body 12 being connected to the rear end of the frame 10 by a hinge connection 13, Figure 1.

The truck body 12 includes a rear wall 14 that has an opening 15 therein whereby the contents of the truck body such as coal, can be discharged from the truck body. A moveable door 16 normally closes the opening 15 to prevent accidental discharge of the coal from the body 12 out through the discharge chute 17.

The present invention is directed to a scraping device whereby any coal remaining in the corners or bottom of the truck body 12 can be scraped and pushed out through the discharge chute without the necessity of having a person climbing onto the truck body 12. The truck body 12 further includes spaced parallel sidewalls 18 and 19 and arranged adjacent the sidewall 18 is a moveable support member 20. A pin or shaft 21 pivotally connects one end of the support member 20 to the truck body 12.

Figure 3:
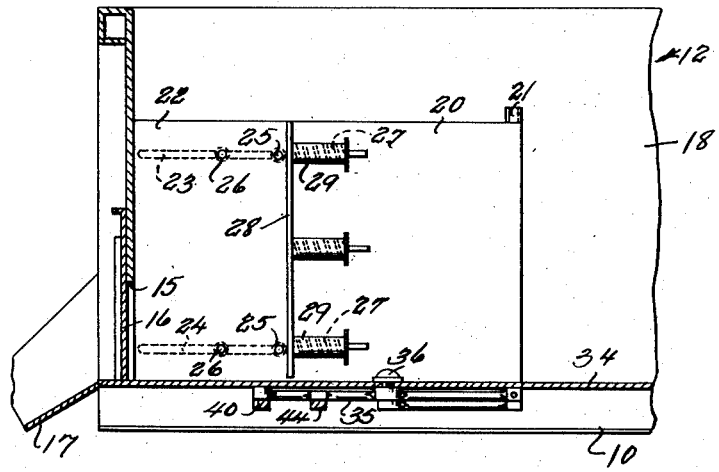
Figure 3 is a sectional view taken on the line 3—3 of Figure 2.
Figure 4:
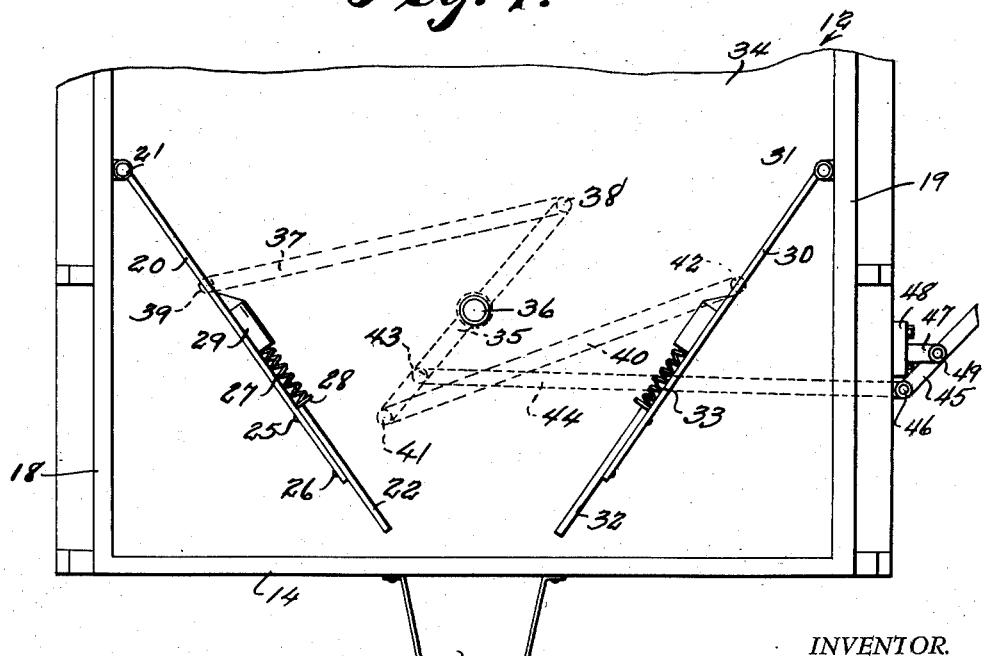
Figure 4 is a view similar to Figure 2, but showing the position of the parts after the scraping device has been actuated.

Slidably connected to the support member 20 is a plate 22. For guiding the plate 22 during its movement, the support member 20 is provided with a pair of spaced parallel slots 23 and 24, Figure 3. A pair of pins 25 and 26 are arranged adjacent each end of the plate 22, and the pins 25 and 26 project from the plate 22 and ride in the slots 23 and 24 as the plate 22 is extended and retracted along the support member 20. For normally urging the plate 22 to its extended position, as shown in Figure 4, a plurality of coil springs 27 are provided. The coil springs 27 are normally seated in a housing 29 so that the coal or the like will not damage the coil springs. The outer ends of each of the springs 27 are secured to a flange 28 that projects from the plate 22.

Similarly, a second support member 30 is arranged adjacent the other sidewall 19 of the truck body 12, and a pin 31 pivotally connects the support member 30 to the body 12. A plate 32 is slidably connected to the support member 30 in the same manner that the plate 22 is connected to the support member 20. Coil springs 33 normally urge the plate 32 to its extended position.

For actuating the scraping device of the present invention, a plurality of links and levers are arranged just below the floor or bottom wall 34 of the truck body 12. Thus, a lever 35 is pivotally connected to the floor 34 by a pin or bolt 36. A first link 37 has one of its ends pivotally connected to the lever 35 by a pin 38, while the other end of the link 37 is pivotally connected to the support member 20 by a pin 39. A second link 40 has one of its ends pivotally connected to the other end of the lever 35 by a pin 41, while the other end of the link 40 is pivotally connected to the support member 30 by a pin 42. A pin 43 pivotally connects a rod 44 to the lever 35.

The outer end of the rod 44 is pivotally connected to a handle or bar 45 by a pin or bolt and nut assembly 46. The handle 45 is positioned between a pair of ears 47 which project from a bracket 48 that is secured to the side of the truck body 12, there being a pin 49 pivotally connecting the handle 45 to the ears 47.

Figure 2:
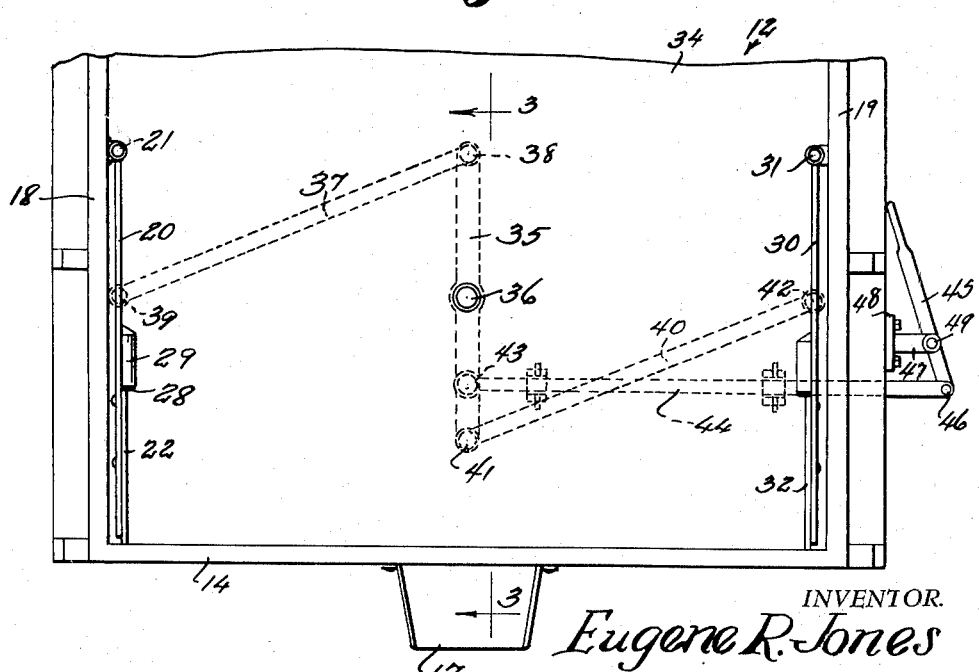
Figure 2 is a fragmentary top plan view of the dump truck.

In use, coal or other similar material, is transported in the dump truck to the desired location, and when the contents of the truck body 12 are to be discharged, the truck body 12 is pivoted or tilted to the position shown in Figure 1. Then, the door 16 is moved away from the opening 15 so that the major portion of the contents in the truck body 12 will be dispensed through the discharge chute 17. However, a portion of the coal or other material usually packs or remains in the corners and bottom of the truck body 12 and the scraping device of the present invention enables the truck operator to scrape and push out this remaining material onto the discharge chute 17. Thus, normally the parts of the scraper device are in the position shown in Figure 2. Then, to actuate the scraper device, the user merely pivots or moves the handle 45 from the position shown in Figure 2 to the position shown in Figure 4. This movement of the handle 45 causes the various links and levers which are disposed below the floor 34 to move from the position shown in Figure 2 to the position shown in Figure 4. As these links and levers move, they pivot the support members 20 and 30 away from the sidewalls of the truck body 12 to the position shown in Figure 4. As soon as the support members 20 and 30 start to pivot, the coil springs 27 move the plate 22 to its extended position, and the coil springs 33 move the plate 32 to its extended position. The extensible plates 22 and 32 insure that any coal remaining on the floor 34 will be scraped and pushed onto the discharge chute 17 as the device is actuated by the handle 45. It will be noted that the lower surfaces of the support members and plates are approximately flush with the upper surface of the floor 34, so that any coal or other material which is stuck to the floor 34 will be dislodged by the swinging movement of the support members and plates. After all of the coal has been scraped onto the discharge chute 17, the support members and plates are moved to their normal position, as shown in Figure 2 by means of the handle 45.

From the foregoing, it is apparent that a device has been provided which will enable a person to readily scrape and push out any coal or other material which may be left in the corners or bottom of a coal truck after the truck body has been raised. Normally, it is the practice for the operator to climb onto the truck body 12 and dislodge this clogged or packed coal by means of a shovel or other implement. Since the truck body 12 may be slippery, as from exposure from rain, snow, or the like, this is a dangerous task. By using the scraper of the present invention, all of the coal can be scraped and pushed from the truck body 12 without the necessity of having the operator climb onto the truck.

What I claim:

1. In a dump truck, the combination with a wheeled frame, a body supported by said frame and mounted for pivotal movement about a horizontal axis, said body including a floor, a pair of spaced parallel sidewalls projecting from said floor, a discharge chute projecting from the rear end of said body, of a manually operable means for scraping the remaining contents from said body and pushing the remaining contents through said discharge chute, said last named means comprising a support member arranged adjacent each sidewall of said body and pivotally connected thereto, a plate slidably connected to each of said support members, coil springs for normally urging said plates to their extended position, a handle pivotally connected to the exterior of said truck body, and means operatively connecting said handle to said support members.

2. In a dump truck, the combination with a wheeled frame, a body supported by said frame and mounted for pivotal movement about a horizontal axis, said body including a floor, a pair of sidewalls projecting from said floor, a discharge chute projecting from said body, of a manually operable means for scraping the remaining contents from said body and pushing the remaining contents through said discharge chute, said last named means comprising a support member arranged adjacent each sidewall of said body and pivotally connected thereto, a plate slidably connected to each of said support members, resilient means for normally urging said plates to their extended position, a handle connected to the exterior of said truck body, and means operatively connecting said handle to said support members.

3. In a dump truck, the combination with a wheeled frame, a truck body supported on said frame and mounted for pivotal movement about a horizontal axis, a discharge chute arranged on the rear of said body, of a manually operable means for scraping said truck body and pushing the remaining portion of the load onto the said discharge chute, said means comprising a pair of spaced vertically disposed support members arranged in said truck body and pivotally connected thereto, means connected to said support members for pivoting the latter, a plate slidably connected to each of said support members, resilient means for normally urging said plates to their extended position, a handle connected to the exterior of said truck body, and means operatively connecting said handle to said support members.

EUGENE R. JONES.

REFERENCES CITED

The following references are of record in the file of this patent:

UNITED STATES PATENTS

| Number | Name | Date |
|---|---|---|
| 681,927 | Pharis | Sept. 3, 1901 |
| 1,485,632 | Shea | Mar. 4, 1924 |
| 1,776,034 | Krahn | Sept. 16, 1930 |
| 2,091,519 | Noyer | Aug. 31, 1937 |
| 2,260,947 | Leach et al. | Oct. 28, 1941 |
| 2,267,526 | Kutscha | Dec. 23, 1941 |

FOREIGN PATENTS

| Number | Country | Date |
|---|---|---|
| 337,681 | Italy | Mar. 11, 1936 |